(12) United States Patent
Aoki et al.

(10) Patent No.: US 7,369,765 B2
(45) Date of Patent: May 6, 2008

(54) OPTICAL NETWORK WITH SELECTIVE MODE SWITCHING

(75) Inventors: Yasuhiko Aoki, Kawasaki (JP); Susumu Kinoshita, Plano, TX (US); Cechan Tian, Plano, TX (US); Olga I. Vassilieva, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 582 days.

(21) Appl. No.: 10/787,496

(22) Filed: Feb. 26, 2004

(65) Prior Publication Data

US 2005/0191054 A1     Sep. 1, 2005

(51) Int. Cl.
*H04J 14/00* (2006.01)

(52) U.S. Cl. .................. 398/45; 398/59; 398/69; 398/83; 398/51; 398/54; 398/77

(58) Field of Classification Search .................. 398/82, 398/83, 57, 59, 66, 74, 69, 45, 51, 54, 58, 398/71
See application file for complete search history.

(56) References Cited

U.S. PATENT DOCUMENTS

| | | | | |
|---|---|---|---|---|
| 5,771,112 | A | 6/1998 | Hamel et al. | 359/128 |
| 5,778,118 | A * | 7/1998 | Sridhar | 385/24 |
| 5,880,864 | A * | 3/1999 | Williams et al. | 398/71 |
| 5,903,371 | A | 5/1999 | Arecco et al. | 359/119 |
| 6,032,041 | A * | 2/2000 | Wainfan et al. | 455/427 |
| 6,310,883 | B1 * | 10/2001 | Mann et al. | 370/408 |
| 6,385,366 | B1 * | 5/2002 | Lin | 385/24 |
| 6,456,406 | B1 | 9/2002 | Arecco et al. | 359/119 |
| 6,456,407 | B1 | 9/2002 | Tammela et al. | 359/119 |
| 6,590,681 | B1 | 7/2003 | Egnell et al. | 359/127 |
| 6,889,007 | B1 * | 5/2005 | Wang et al. | 398/79 |
| 7,072,584 | B1 * | 7/2006 | Lichtman et al. | 398/59 |
| 7,088,920 | B2 * | 8/2006 | Krishnaswamy et al. | 398/58 |
| 2002/0067523 | A1 | 6/2002 | Way | 359/119 |

(Continued)

FOREIGN PATENT DOCUMENTS

WO    WO 99/65164    12/1999

OTHER PUBLICATIONS

Kinoshita et al., "Flexible Twin Open Ring Metro WDM Network," OECC, pp. 713-714, Oct. 2003.

(Continued)

*Primary Examiner*—Kenneth Vanderpuye
*Assistant Examiner*—Thi Q. Le
(74) *Attorney, Agent, or Firm*—Baker Botts L.L.P.

(57) ABSTRACT

A method for communicating optical traffic in a network comprising a plurality of network nodes includes receiving traffic to be added to the network at a network node. The network is operable to communicate received traffic in an optical signal comprising one or more channels. The method also includes determining a data rate and one or more destination nodes of the received traffic and assigning the received traffic to one or more of the channels of the optical signal based on the determined data rate and the destination nodes. The method further includes configuring one or more of the network nodes to process the traffic contained in the assigned channels based on the data rate and the destination nodes of the optical traffic and communicating the traffic through network in the assigned channels of the optical signal based on the determined data rate and the one or more destination nodes.

21 Claims, 7 Drawing Sheets

U.S. PATENT DOCUMENTS

| | | | |
|---|---|---|---|
| 2002/0101632 A1* | 8/2002 | Meckler | 359/115 |
| 2002/0145779 A1 | 10/2002 | Strasser et al. | 359/124 |
| 2002/0149817 A1 | 10/2002 | Kiliccote et al. | 359/119 |
| 2003/0142980 A1* | 7/2003 | Baba | 398/56 |
| 2003/0223409 A1* | 12/2003 | Wiebe | 370/352 |
| 2004/0252688 A1* | 12/2004 | May et al. | 370/389 |
| 2005/0111495 A1* | 5/2005 | Gumaste et al. | 370/535 |
| 2006/0153563 A1* | 7/2006 | Feuer et al. | 398/45 |
| 2006/0274734 A1* | 12/2006 | DeMartino | 370/352 |

OTHER PUBLICATIONS

Tian et al., "OUPSR Protected Flexible Metro WDM Network," ECOC, pp. 826-827, 2003.

Boskovic et al., "Broadcast and Select OADM Nodes Application and Performance Trade-offs," OFC, pp. 158-159, 2002.

Kinoshita et al. "Flexible Metro WDM Network with Photonic Domains", Fujitsu Laboratories of America, Inc., 3 pages, Feb. 24-26, 2004.

Suzuki et al., "Prototype of 12.5GHz-Spaced Tapped-Type OADM for DWDM Metro Ring Networks," ECOC-IOOC Proceedings—vol. 4, pp. 902-903, Sep. 21-25, 2003.

Wolde, J., et al., "Optical Ethernet Metro Access Network Protype: Implementation and Results," ECOC-IOOC 2003, 3 pages, Sep. 21-25, 2003.

Bacque, B. et al., "R-OADM Architecture—Now you can Control the Light," Tropic Networks, pp. 1-11, 2003.

U.S. Appl. No. 10/108,734, entitled "Method and System for Control Signaling in an Open Ring Optical Network," filed Mar. 27, 2002.

U.S. Appl. No. 10/108,741, entitled "Method and System for Testing During Operation of an Open Ring Optical Network," filed Mar. 27, 2002.

U.S. Appl. No. 10/112,022, entitled "Flexible Open Ring Optical Network and Method," filed Mar. 28, 2002.

U.S. Appl. No. 10/158,523, entitled "Optical Ring Network with Optical Subnets and Method," filed May 29, 2002.

U.S. Appl. No. 10/158,348, entitled "Multiple Subnets in an Optical Ring Network and Method," filed May 29, 2002.

U.S. Appl. No. 10/159,499, entitled "Combining and Distributing Amplifiers for Optical and Network and Method," filed May 30, 2002.

U.S. Appl. No. 10/159,307, entitled "Optical Add/Drop Node and Method," filed May 30, 2002.

U.S. Appl. No. 10/159,464, entitled "Passive Add/Drop Amplifier for Optical Network and Method," filed May 30, 2002.

U.S. Appl. No. 10/246,053, entitled "Optical Network and Distributed Sub-Band Rejections," filed Sep. 17, 2002.

U.S. Appl. No. 10/262,818, entitled "Optical Ring Network with Hub Node and Method," filed Oct. 1, 2002.

U.S. Appl. No. 10/448,169, entitled "Optical ring Network with Selective Signal Regeneration and Wavelength Conversion," filed May 29, 2003.

U.S. Appl. No. 10/627,548, entitled "System and Method for Communicating Optical Traffic Between Ring Networks," filed Jul. 25, 2003.

U.S. Appl. No. 10/629,021, entitled "Optical Network with Sub-Band Rejection and Bypass," filed Jul. 28, 2003.

* cited by examiner

OPTICAL NETWORK WITH SELECTIVE MODE SWITCHING

TECHNICAL FIELD OF THE INVENTION

The present invention relates generally to optical transport systems, and more particularly to an optical network with selective mode switching.

BACKGROUND

Telecommunications systems, cable television systems, and data communication networks use optical networks to rapidly convey large amounts of information between remote points. In an optical network, information is conveyed in the form of optical signals through optical fibers. Optical fibers comprise thin strands of glass capable of transmitting the signals over long distances with very low loss.

Optical networks often employ wavelength division multiplexing (WDM) or dense wavelength division multiplexing (DWDM) to increase transmission capacity. In WDM and DWDM networks, a number of optical channels are carried in each fiber at disparate wavelengths. Network capacity is based on the number of wavelengths, or channels, in each fiber and the bandwidth, or size of the channels.

The topology in which WDM and DWDM networks are built plays a key role in determining the extent to which such networks are utilized. Ring topologies are common in today's networks. WDM add/drop units serve as network elements on the periphery of such optical rings. By using WDM add/drop equipment at each network element (node), the entire composite signal can be fully demultiplexed into its constituent channels and switched (added/dropped or passed through).

SUMMARY OF THE INVENTION

In one embodiment, a method for communicating optical traffic in a network comprising a plurality of network nodes includes receiving traffic to be added to the network at a network node. The network is operable to communicate received traffic in an optical signal comprising one or more channels. The method also includes determining a data rate and one or more destination nodes of the received traffic and assigning the received traffic to one or more of the channels of the optical signal based on the determined data rate and the destination nodes. The method further includes configuring one or more of the network nodes to process the traffic contained in the assigned channels based on the data rate and the destination nodes of the optical traffic and communicating the traffic through network in the assigned channels of the optical signal based on the determined data rate and the one or more destination nodes.

In another embodiment, an optical network operable to communicate traffic in an optical signal in one or more channels comprises a plurality of network nodes. The network nodes are operable to receive traffic to be added to the network at the node and communicate the received traffic through the network in the optical signal based on a data rate of the received traffic and one or more nodes for which the received traffic is destined. The optical network also includes a network management system. The network management system is operable to determine the data rate of the received traffic and determine the one or more destination nodes of the received traffic. The network management system of the optical network is further operable to assign the received traffic to the one or more channels of the optical signal based on the determined data rate and the one or more destination nodes of the received traffic and to configure one or more of the nodes on the network to process the traffic contained in the assigned channels based on the determined data rate and the one or more destination nodes of the received traffic.

Technical advantages of particular embodiments of the present invention may include a system and method that facilitate the handling of optical traffic of varying data rates at the add/drop nodes of an optical network. Such traffic may be handles in a way so as to reduce the number of optical transmitter/receiver pairs required at any one time in an add/drop node of an optical network. Furthermore, particular embodiments may maximize the efficiency of each add/drop node within the network by using available transmitter/receiver pairs for auxiliary functions.

Other technical advantages will be readily apparent to one skilled in the art from the figures, descriptions, and claims included herein. Moreover, while specific advantages have been enumerated above, various embodiments may include all, some, or none of the enumerated advantages.

BRIEF DESCRIPTION OF THE DRAWINGS

For a more complete understanding of the present invention and advantages thereof, reference is now made to the following description taken in conjunction with the accompanying drawings, in which.

DESCRIPTION OF EXAMPLE EMBODIMENTS

Figure 1:
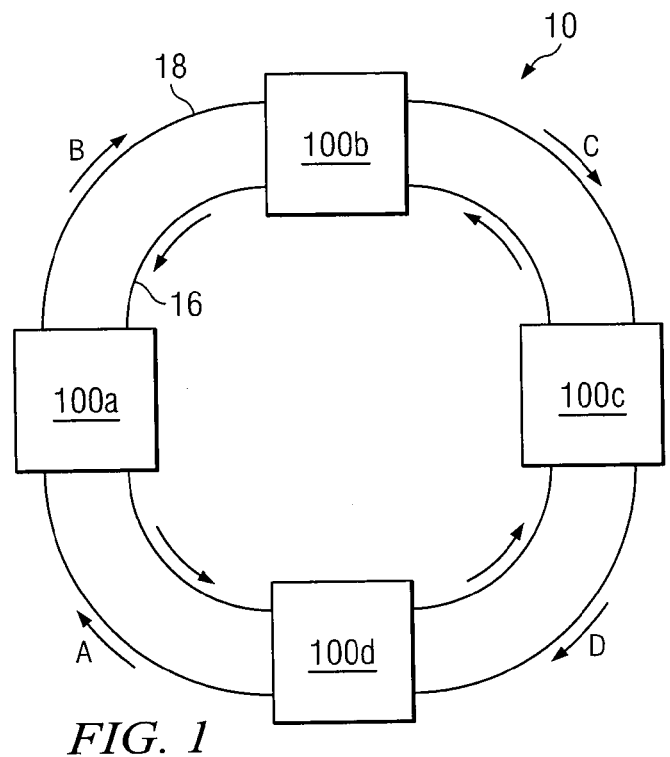
FIG. 1 illustrates an example optical network.

FIG. 1 illustrates an example optical network 10. In this embodiment, the network 10 is an optical network in which a number of optical channels are carried over a common path at disparate wavelengths. The network 10 may be a wavelength division multiplexing (WDM), dense wavelength division multiplexing (DWDM), or other suitable multi-channel network. The network 10 may be used in a short-haul metropolitan network, a long-haul inter-city network, or any other suitable network or combination of networks.

Network 10 includes a plurality of add/drop nodes (ADNs) 100, a first fiber optic ring 16, and a second fiber optic ring 18. Optical information signals are transmitted in different directions on the rings 16 and 18 to provide fault tolerance. Thus each ADN both transmits traffic to and receives traffic from each neighboring ADN. As used herein, the term "each" means every one of at least a subset of the identified items. The optical signals have at least one characteristic modulated to encode audio, video, textual, real-time, non-real-time and/or other suitable data. Modulation may be based on phase shift keying (PSK), intensity modulation (IM) and other suitable methodologies. Although a dual-ring optical network 10 is illustrated in the present example, the present invention may be implemented in any appropriate form of optical network and does not require the use of dual rings.

In the illustrated embodiment, the first ring 16 is a counterclockwise ring in which traffic is transmitted in a counterclockwise direction. The second ring 18 is a clockwise ring in which traffic is transmitted in a clockwise direction. Span A comprises the portion of the counterclockwise ring 16 and clockwise ring 18 between ADN 100d and ADN 100a. Span B comprises the portion of the counterclockwise ring 16 and the clockwise ring 18 between ADN 100a and ADN 100b. Span C comprises the portion of the counterclockwise ring 16 and the clockwise ring 18 between ADNs 100b and 100c. Span D comprises the portion of the counterclockwise ring 16 and the clockwise ring 18 between ADN 100c and ADN 100d.

The ADNs 100 are operable to add and drop traffic to and from the rings 16 and 18. At each ADN 100, traffic received from local clients may be added to the rings 16 and 18 while traffic destined for local clients may be dropped. Traffic may be added to the rings 16 and 18 by inserting the traffic channels or otherwise combining signals of the channels into a transport signal of which at least a portion is transmitted on one or both rings 16 and 18. Traffic may be dropped from the rings 16 and 18 by making the traffic available for transmission to the local clients. Thus, traffic may be dropped and yet continue to circulate on a ring 16 and 18. In particular embodiments, traffic is passively added to and dropped from rings 16 and 18. "Passive" in this context means the adding or dropping of channels without power, electricity, and/or moving parts. An "active" device would thus use power, electricity or moving parts to perform work. In a particular embodiment, traffic may be passively added to and/or dropped from ring 16 and 18 by splitting/combining, which is without multiplexing/demultiplexing, in the transport rings and/or separating parts of a signal in the ring.

In certain embodiments, the ADNs 100 are further operable to multiplex data from clients for adding to rings 16 and 18 and to demultiplex channels of data from rings 16 and 18 for clients. In these embodiments, ADNs 100 may also perform optical to electrical conversion of the signals received from and sent to the clients.

In addition, as described in more detail below, rings 16 and 18 each have termini in one of the ADNs 100, such that the rings 16 and 18 are "open" rings. That is, the rings 16 and 18 do not form a continuous transmission path around network 10 such that traffic does not continue and/or include an obstruction on a ring past a full circuit of the network 10. The opening in rings 16 and 18 terminates, and thus removes channels at the terminal points. Thus, after traffic of a channel is transmitted to each ADN 100 in the counterclockwise and/or clockwise rings 16 and 18 by the combined ADNs 100, the traffic is removed from rings 16 and 18. This prevents interference of each channel with itself.

The channel capacity of network 10 may be divided and assigned to each ADN 100 depending on the local or other traffic of the ADNs 100. For an embodiment in which the total number of channels is forty, the total number of ADNs 100 is four, and the ADN traffic is even in each ADN 100, then ten channels may be assigned to each ADN 100. If each channel is modulated by 10 Gbps data-rate, each node can send 100 Gbps (10 Gbps×10 channel) to all ADNs in the network 10. For a DWDM system, the channel may be between 1530 nm and 1565 nm. The channel spacing may be 100 GHz or 0.8 nm, but may be suitably varied. In addition, channel spacing is flexible in rings 16 and 18 and the ADN elements on rings 16 and 18 need not be configured with channel spacing. Instead, for example, channel spacing may be set up by add/drop receivers and transmitters that communicate with and/or are coupled to the clients. The rings 16 and 18 add, drop, and communicate traffic independently of and/or regardless of the channel spacing of the traffic.

Figure 2:
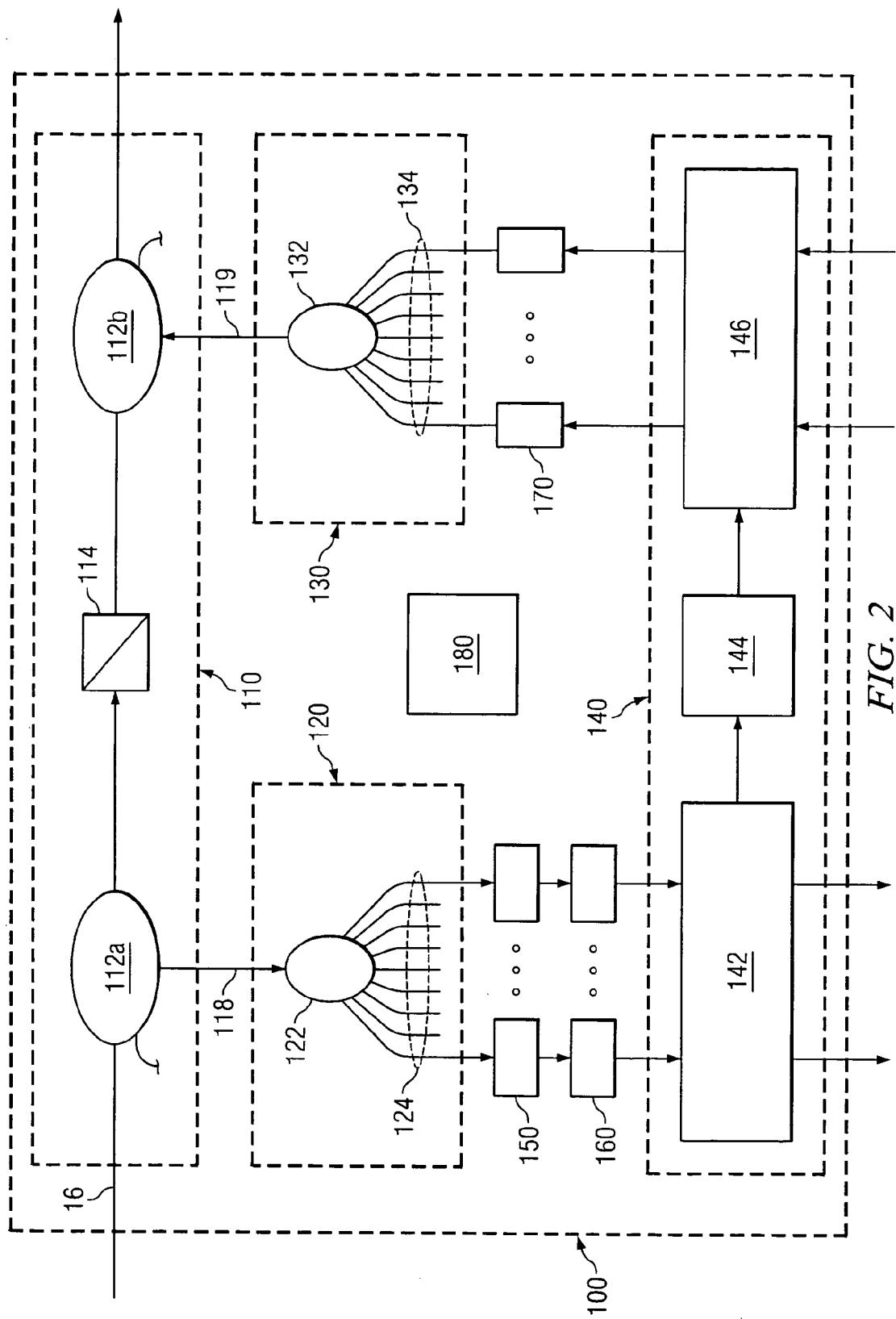
FIG. 2 illustrates details of an example add/drop node.

FIG. 2 illustrates details of an example ADN 100. In certain embodiments, ADNs 100 are operable to process traffic in different channels based on the type of optical traffic communicated on that channel. This ability allows the use of transmitter/receiver pairs used in an ADN 100 at any moment in time to be optimized for the type of traffic. Thus, if transmitter/receiver pairs within a given ADN 100 are not required to be used to transmit or receive certain traffic, based on its data rate, those transmitter/receiver pairs may be used for other purposed within network 10, thereby optimizing the use of the transmitter/receiver pairs in each ADN 100. Optical network management software can set data rate thresholds, discussed below, which are used to determine how the traffic in each channel is handled at any one moment in time. In certain embodiments, the data rate of the optical traffic received at an ADN 100 may be monitored every ten to twenty seconds to facilitate dynamic changes in the configuration of ADN 100 to handle changes in the data rate of traffic in a channel.

Transport element 110 passively adds and drops traffic to and from ring 16 without multiplexing or demultiplexing the signals on the ring and/or provides other interaction of the ADNs 100 with ring 16 using optical couplers or other suitable optical splitters. An optical coupler is any device operable to combine or otherwise passively generate a combined optical signal based on two or more optical signals without multiplexing and/or to split or divide an optical signal into discrete optical signals or otherwise passively generate discrete optical signals based on the optical signal without demultiplexing. The discrete signals may be similar or identical in form and/or content. For example, the discrete signals may be identical in content and identical or substantially similar in energy, may be identical in content and differ substantially in energy, or may differ slightly or otherwise in content.

In this example, ADN 100 comprises a transport element 110, a distributing element 120, a combining element 130, a switching element 140, and a network management system (NMS) 180. In one embodiment, elements 110, 120, 130, 140, and 180, as well as components within these elements, may be interconnected with optical fiber links. In other embodiments, the components may be implemented in part or otherwise with planar waveguide circuits and/or free space optics. In addition, the elements of ADN 100 may each be implemented as one or more discrete cards within a card shelf of the ADN 100. Furthermore, functionality of an element itself may be distributed across a plurality of discrete cards. In this way, ADN 100 is modular, upgradeable, and provides a pay-as-you-grow architecture.

Transport element 110 may comprise passive couplers or other suitable optical splitters 112 and a rejection filter 114. In one embodiment, optical coupler 112 is a fiber coupler with two inputs and two outputs. Optical coupler 112 may, in other embodiments, be combined in whole or part with a wave guide circuit and/or free space optics. It will be understood that coupler 112 may include one or any number of any suitable inputs and outputs and that the coupler 112 may comprise a greater number of inputs than outputs or a greater number of outputs than inputs. In operation, the transport element 110 is operable to passively add local traffic to ring 16 and to passively drop at least local traffic from ring 16.

Transport element 110 may also comprise a rejection filter 114. Rejection filter 114 blocks a particular wavelength or sub-band of optical traffic from passing through transport element 110. A sub-band is a portion of the bandwidth of the network. Each sub-band may carry none, one, or a plurality of traffic channels. The traffic channels may be flexibly spaced within the sub-band. Traffic contained in un-rejected wavelength or sub-bands is passed through to other components of the network. Such passed-through traffic may be rejected at another node in the network. The rejection of a particular wavelength or sub-band by rejection filter 114 enables traffic in that wavelength or sub-band to be added and dropped at ADN 100 without interference with traffic in the wavelength or sub-band being communicated on the network.

In the specific embodiment of FIG. 2, transport element 110 includes a passive optical splitter set having a drop coupler 112a and an add coupler 112b. Drop coupler 112a passively splits the ingress signal on ring 16 into two generally identical signals. A passthrough signal is forwarded to rejection filter 114 while a drop signal is forwarded to distributing element 120 via segment 118. The signals may be substantially identical in content and/or energy. Add coupler 112b passively combines the passthrough signal from drop coupler 112a and an add signal comprising local add traffic from combining element 130 via segment 119.

The combining and splitting of signals may be performed by a single coupler 112, as illustrated, or by a plurality of couplers each having one or a portion of the combiner or splitter elements. Although the dual coupler arrangement increases the total number of couplers in transport element 110, the two-coupler arrangement may reduce channel interference by dropping local traffic from ring 16 before adding traffic to ring 16.

Transport element 110 may also include a dispersion compensation fiber (DCF) segment to provide dispersion compensation. In one embodiment, a DCF segment may be included where network 10 operates at data rates at or above 2.5 Gbps, if the circumference of the ring is over 40 kilometers, or depending on the length of the span to the previous ADN. For example, dispersion compensation may be used when a 10 Gbps signal travels over 40 kilometers of 1.3 micrometer zero-dispersion single mode fiber.

Distributing element 120 may further comprise an optical splitter 122. Splitter 122 may comprise a splitter with an optical fiber ingress lead 118 and a plurality of optical fiber drop leads 124. Drop leads 124 may be connected to one or more tunable filters 150, which in turn may be connected to one or more drop optical receivers 160. Locally destined traffic is dropped to distributing element 120 via segment 118. Distributing element 120 copies the drop signal comprising the locally destined traffic into multiple generally identical signals and forwards each signal to filter 150 via a drop lead 124. Although the illustrated embodiment shows nine drop leads 124, it should be understood that any appropriate number of drop leads 124 may be implemented. The optical signal received by each filter 150 is filtered such that only a selected wavelenth(s) is passed through to the associated receiver 160. Optical receiver 160 is operable to convert received optical signals into electrical signals. Filters 150 may be tunable filters or other suitable filters and receivers 160 may be broadband or other suitable receivers.

Switch element 140 is operable to receive traffic from optical receivers 160. After receiving the optical traffic, switch element 140 may forward the traffic (or a portion thereof) to a local client and/or to combining element 130 for transmission of the traffic to a subsequent ADN 100. Switch element 140 may comprise a first Layer Two (L2) switch 142, a time-to-live (TTL) monitor 144, and a second L2 switch 146. Switch 142 is operable to direct electrical traffic based on the addressing information associated with the traffic. For example, in the present example, switch 142 receives electrical traffic from optical receivers 160 and may direct the received electrical traffic to a local client and/or to another ADN 100 on network 10 depending upon the address information associated with the data packets comprising the traffic. Similarly, switch 146 receives electrical traffic from switch 142 and/or a local client and may direct that optical traffic to another ADN 100 on network based on the address information associated with the traffic.

In some embodiments, TTL monitor 144 may be positioned between switch 142 and switch 146. TTL monitor 144 is operable to terminate electrical traffic at a particular ADN 100. The electrical traffic may contain a TTL code that indicates at which ADN 100 the traffic is to be terminated. For example, if the data in the electrical traffic communicated to TTL monitor 144 from switch 142 contains a TTL code of "0," this may indicate that the data is to be removed from the network at the current ADN 100 in the transmission, while a TTL code of "1" may indicate that the data is to be removed from the network at the next downstream ADN 100 in the transmission and a TTL code of "2" may indicate that the data is to be removed from the network at the second downstream ADN 100 in the transmission. If TTL code is "0," TTL monitor 144 removes the traffic from network 10 at the current ADN 100. However, if the TTL code is not "0," TTL monitor 144 decrements the TTL code by an increment of "1" and forwards the electrical traffic to switch 146, where it is forwarded to the next ADN 100.

Prior to addition to ring 16, locally-derived traffic and/or electrical traffic forwarded by switch 142 to switch 146 is transmitted by a plurality of add optical transmitters 170 to combining element 130 of ADN 100 where the signals contained in the optical traffic are combined and forwarded to the transport element 110 via segment 119. Combining element 130 may comprise a splitter 132 with a plurality of optical fiber add leads 134 which may be connected to one or more add optical transmitters 170 associated with a client. Splitter 132 further comprises an optical fiber egress lead 119. Optical transmitter 170 may include wavelength tunable lasers. In this embodiment, a light path may be established between two ADNs 100 by setting a laser of one of the optical transmitters 170 in the transmitting ADN to a specified frequency and correspondingly setting to the specified frequency a filter of an optical receiver in the receiving ADN. No other configuration is necessary in network 10 as the traffic channel may be passively combined with and separated from other traffic and is passively added to and dropped from ring 16. It will be understood that optical transmitters with fixed lasers and optical receivers with fixed filters may be used in connection with the present invention.

The overall control of ADN 100 may be accomplished using a network management system (NMS). The NMS may reside within an ADN 100, such as ADN 100a, illustrated in FIG. 4, in a different ADN 100, or external to all of the ADNs 100. The NMS may comprise logic encoded in media for performing network and/or ADN monitoring, failure detection, protection switching, and loopback or localized testing functionality of the network 10. In addition, NMS 180 is operable to determine a data rate and destination node(s) of traffic received at one or more ADNs 100 from a local client to be communicated over network 10. NMS 180 can assign received optical traffic to one or more channels based on the data rate and destination node(s) of the traffic. Furthermore, NMS 180 can control the configuration of the components of each ADN 100 based on the traffic data rate and the destination nodes(s) of the traffic added to network 10 at an ADN 100 by a local client. As discussed in more detail below with respect to FIGS. 4-7, NMS 180 may configure components such as rejection filter 114, tunable filters 150 and switch element 140 to process traffic based on the traffic data rate and the destination node(s) of the received traffic. In particular embodiments, NMS 180 may receive and transmit information needed to make these determinations, assignments, and node configurations using optical supervisory channel (OSC) traffic that is transmitted in an external band separate from the revenue-generating traffic. Logic may comprise software encoded in a disk or other computer-readable medium and/or instructions encoded in an application specific integrated circuit (ASIC), field programmable gate array (FPGA), or other processor or hardware. The functionality of the NMS may be performed by other components of the network 10 and/or be otherwise distributed or centralized.

Although FIG. 2 illustrates the ADN 100 components associated with ring 16, identical components may also be associated with ring 18. In some embodiments, rings 16 and 18 may share the same sets of ADN 100 components through the use of a switch appropriately located in ADN 100 which is operable to selectively switch between the optical traffic on ring 16 and the optical traffic on ring 18.

Figure 3:
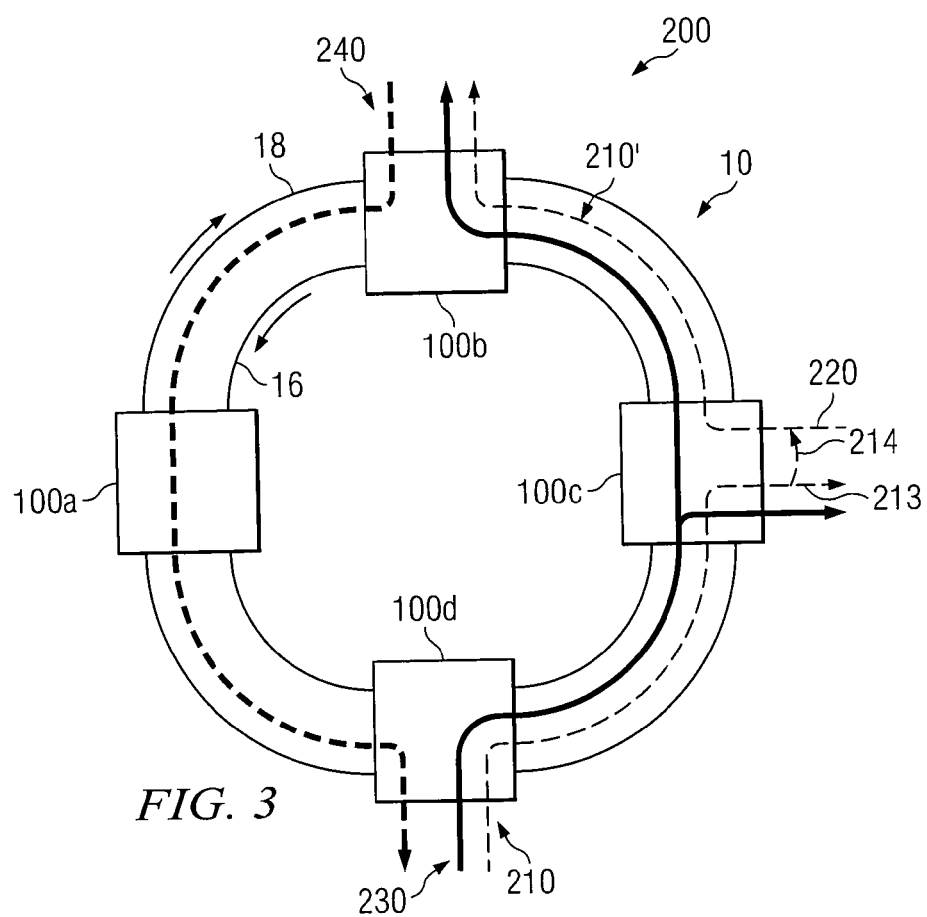
FIG. 3 illustrates example optical traffic flow in an optical network.

FIG. 3 illustrates example optical traffic flow in network 10. Network 10 is capable of handling traffic flow of varying data transmission rates using the functionality of ADNs 100. In conventional optical networks, the required number of transmitter/receiver pairs in the ADNs increases sharply as the amount of optical traffic increases. The number of transmitter/receiver pairs in an optical network directly effects the cost of that network. Due to the mode switching capability of ADNs 100, network 10 is capable of handling optical traffic of various data transmission rates while reducing the number of transmitter/receiver pairs required at any one moment in each ADN 100.

In certain embodiments, the traffic in network 10 may be categorized into three main types of optical traffic. These types of traffic are: (1) optically-transmitted/electrically-selected/optically-dropped (OEO) traffic having a data rate from approximately 100 Mbps to approximately 1 Gbps; (2) "point-to-multipoint" traffic having a medium size data rate, for example, approximately 1 Gbps to approximately 5 Gbps; and (3) "point-to-point" or "burst" traffic having a large data rate, for example, approximately 5 Gbps to approximately 10 Gbps in case of the transmitter/receiver bit rate of 10 Gbps. For example, if the data rate of the traffic on network 10 is 100 Mbps, the traffic is transmitted from and processed at particular ADNs 100 as OEO traffic that includes multiple data streams in the same channel. A first portion of OEO traffic may be destined for a first ADN 100, while a second portion is destined for a second ADN 100. The OEO traffic is optically transmitted along network 10 until it reaches a destination node for at least a portion of the OEO traffic, where the OEO traffic electrically-selected using switch element 140 for dropping to a local client and/or forwarding to another ADN 100 on the network based upon addressing information contained in the traffic. The portions of the OEO traffic that are destined for a local client are optically transmitted to that client while the portions of the OEO traffic that are destined for another ADN 100 on network 10 are optically transmitted further downstream on the network. OEO traffic is illustrated in FIG. 3 as traffic stream 210, discussed in more detail below.

Point-to-multipoint traffic may also contain traffic that is destined for multiple ADNs 100. When point-to-multipoint traffic arrives at a destination node, two copies are passively made of the traffic, with one copy being forwarded along network 10 to be transmitted to another destination node and one copy being dropped to a local client at the present destination node. Point-to-multipoint traffic is illustrated in FIG. 3 as traffic stream 230, discussed in more detail below.

Burst traffic is transmitted such that it contains traffic destined for a single node on the optical network. Therefore, when the burst traffic arrives at an ADN 100 other than its destination, the traffic is passively passed through the node and continues along network 10 until it reaches its destination node, where it is dropped to a local client. Burst traffic is illustrated in FIG. 3 as traffic stream 240, discussed in more detail below.

In the present example, traffic streams 210, 220, 230, and 240 are added to network 10 at various ADNs 100. Traffic streams 210, 220, 230, and 240 contain data in one or more channels of an optical signal that comprises all of streams 210, 220, 230, and 240. Traffic stream 210 is added to network 10 at ADN 100d. Traffic stream 210 comprises OEO traffic that includes multiple data streams in the same channel. In the illustrated embodiment, traffic stream 210 includes a first traffic stream 213 destined for ADN 100c and a second traffic stream 214 destined for ADN 100b.

Traffic stream 210 travels on ring 18 to AND 100c where the information it contains is split into two traffic streams 213, 214 based on the destination of the information contained in traffic stream 210. For example, in the illustrated embodiment, traffic stream 213 contains information destined for a local client of ADN 100c, while traffic stream 214 contains information destined for ADN 100b. Traffic stream 213 is dropped to the local client at ADN 100c, while traffic stream 214 continues to travel along ring 16 toward ADN 100b. At ADN 100c, traffic stream 220 is added to optical network 10 from a local client. The information contained in traffic stream 220 is destined for ADN 100b and is added to the information contained in traffic stream 214, which is also destined for ADN 100b. The new combination of traffic stream 220 and traffic stream 214 is illustrated as traffic stream 210'. Traffic stream 210' continues on ring 16 until the information contained in traffic stream 210' is dropped to a local client at ADN 100b.

Traffic stream 230 is also added to optical network 10 at ADN 100d. Traffic stream 230 comprises "point-to-multipoint" optical traffic destined for multiple ADNs in network 10. Traffic channel 230 travels along ring 18 of network 10 as illustrated. At ADN 100c, two copies of the information contained in traffic stream 230 are made with one copy being dropped to a local client and another copy being forwarded on in the network. Traffic stream 230 continues along ring 18 until the information it contains is dropped at ADN 100b.

At ADN 100b, traffic stream 240 is added to ring 18. Traffic stream 240 contains "point-to-point" or "burst" traffic. The information contained in traffic stream 240 is destined for ADN 100d, where it is dropped to a local client after passing through ADN 100a.

The components of ADN 100 allow a single ADN configuration to handle various modes of operation to accommodate traffic of various data rates efficiently. Each ADN 100 contains a transmission buffer and a traffic volume monitor. If the traffic volume monitor detects that the data stored in the transmission buffer is larger than a certain pre-determined threshold level, the operating mode of the ADN 100 will be changed based on the data rate. For example, if the data rate of the traffic is on the order of hundreds of megabytes per second, the traffic is transmitted and received at an ADN as OEO traffic, as illustrated by traffic stream 210. If the data rate of the traffic is of medium size, for example, approximately 1 Gbps to approximately 5 Gbps, the traffic is transmitted and received at an ADN as "point-to-multipoint" traffic, as illustrated by traffic stream 230. If the data rate of the traffic is of large size, for example, greater than approximately 5 Gbps, the traffic is transmitted and received at an ADN as "point-to-point" or "burst" traffic, as illustrated by traffic stream 240.

Figure 4:
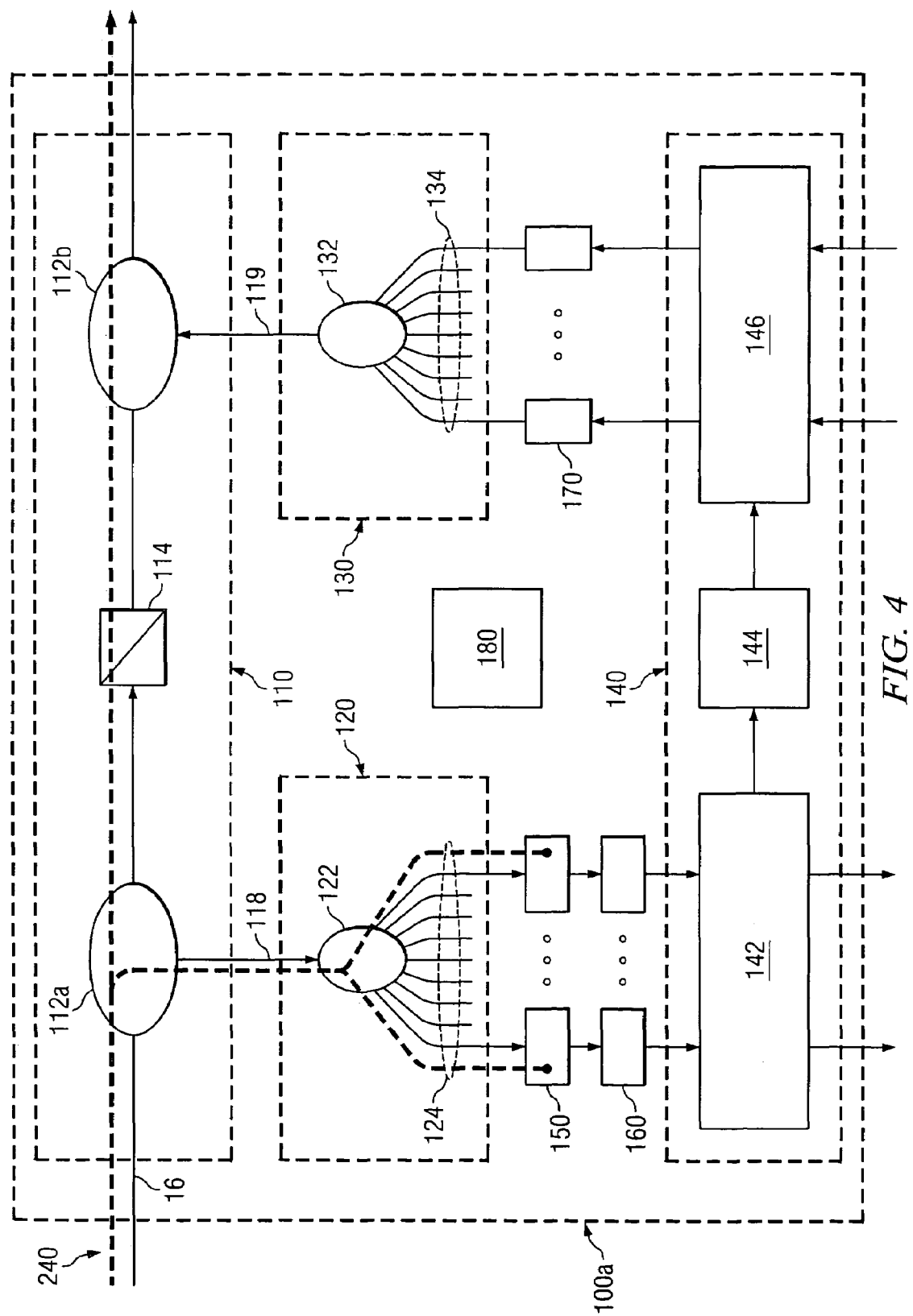
FIG. 4 illustrates an example path of traffic in an exemplary optical channel through an example add/drop node.

FIGS. 4-7 illustrate the specific handling of OEO, point-to-mulitpoint, and burst traffic within ADNs 100. FIG. 4 illustrates an example path of an exemplary optical signal through ADN 240. Traffic stream 240 is a part of this optical signal and contains burst optical traffic. The optical signal containing traffic stream 240 enters ADN 100*a* on ring 16 from ADN 100*b*. Drop coupler 112*a* passively copies the optical signal containing traffic stream 240 into two generally identical signals. A forwarded optical signal continues through ADN 100*a* on ring 16 to be passed to other ADNs in network 10, as illustrated in FIG. 3. NMS 180 configures rejection filter 114 of ADN 100*a* to forward the optical signal through ADN 100*a* because NMS 180 has determined that the optical signal is destined for ADN 100*d*.

The drop optical signal is forwarded to optical splitter 122 where multiple copies are made. Each copy of the optical signal is then forwarded to a tunable filter 150. In this example, tunable filters 150 are configured by NMS 180 to prevent passage of the channel in which stream 240 is transmitted, thereby preventing the information contained in traffic stream 240 from being dropped to a local client at ADN 100*a*, since the traffic contained in stream 240 is destined for ADN 100*d* and not ADN 100*a*.

Figure 5:
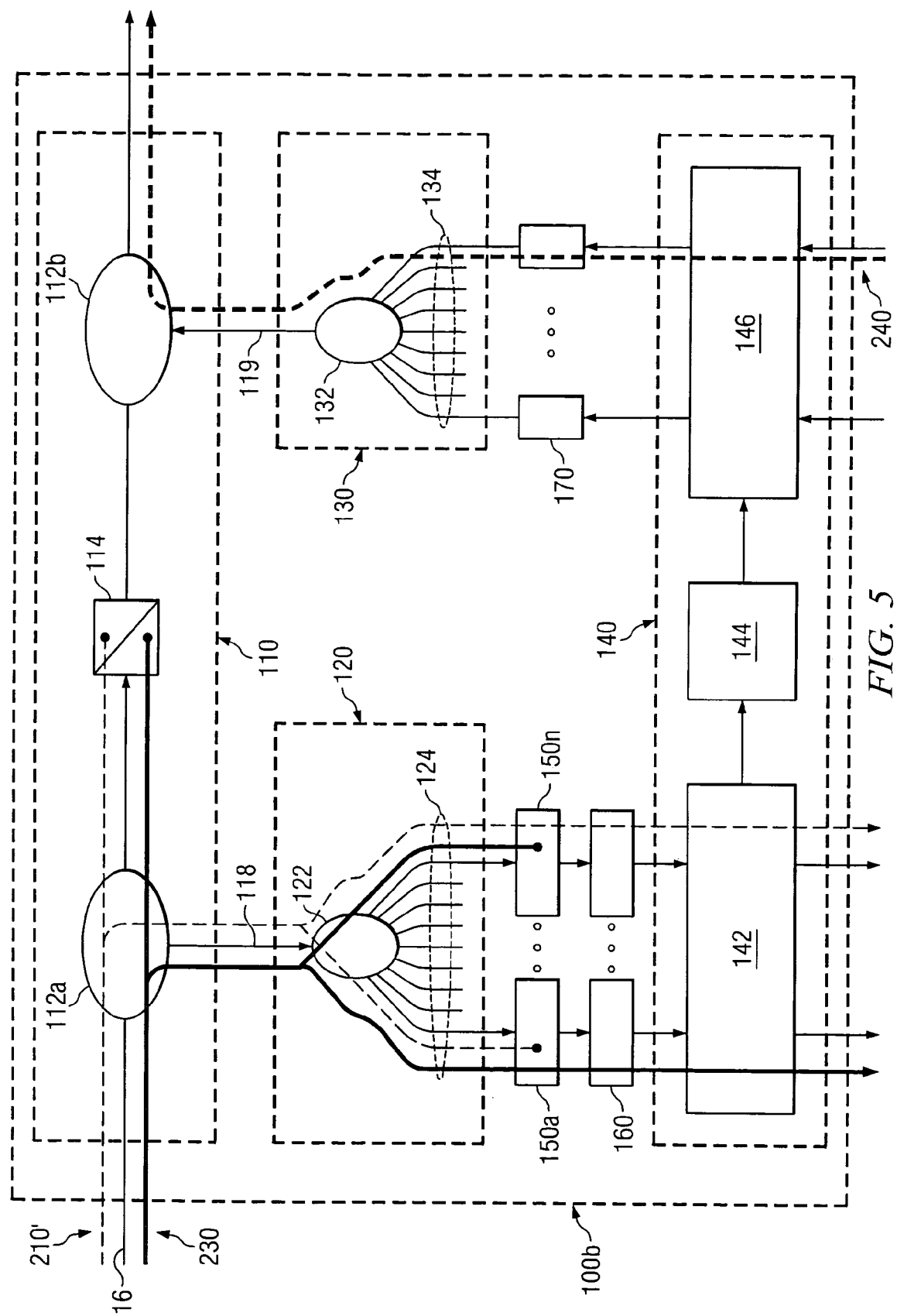
FIG. 5 illustrates another example path of traffic in an exemplary optical channel in an example add/drop node.

FIG. 5 illustrates example paths of optical signals containing optical traffic in exemplary traffic streams 210', 230, and 240 in ADN 100*b*. The optical signal containing traffic streams 210' and 230 enters ADN 100*b* on ring 16. Traffic stream 210' contains information from traffic stream 210 that is destined for ADN 100*b*, which was added to network 10 at ADN 100*d*, and information from traffic stream 220 that is also destined for ADN 100*b*, but was added from a local client at ADN 100*c*. Traffic stream 230 contains information that was added at ADN 100*d* and destined for ADNs 100*c* and 100*b*.

Drop coupler 112*a* passively copies the optical signal containing traffic streams 210' and 230 into two generally identical signals. A copy of the optical signal containing traffic streams 210' and 230 is forwarded to rejection filter 114, which is configured by NMS 180, in response to the determined data rate and destination node(s), to block the optical signal from being communicated to other ADNs in network 10 in order to avoid any interference with optical traffic that may be added to network 10 from subsequent ADNs. A copy of the optical signal containing traffic streams 210' and 230 is forwarded to optical splitter 122 where multiple copies are made. Each copy of the optical signal is then forwarded to tunable filters 150, which are configured by NMS 180, in response to the determined data rate and the destination node(s) to pass only the desired optical channels. In the illustrated example, filter 150*a* is configured to pass the optical channel containing traffic stream 230, while filtering out the optical channel containing traffic stream 210'. Similarly, filter 150*n* is configured to pass the optical channel containing traffic stream 210', while filtering out the optical channel containing traffic stream 230. The filtered optical signals are then communicated from filters 150 to optical receivers 160 where the filtered signals are converted from optical signals to electrical signals. Optical receivers 160 then communicate the filtered electrical signals to switch 142, which is configured by NMS 180, in response to the determined data rate and destination node(s), to transmit the signals in a particular manner. In the present example, switch 142 is configured to pass the electrical signals to a local client without directing any signals back onto ring 16 through switch 146 because the information contained in traffic streams 210' and 230 is destined for ADN 100*b* and not for any subsequent ADNs 100.

Furthermore, an optical signal containing traffic stream 240 is added to network 10 at ADN 100*b* from a local client. In this example, switch 146 is configured by NMS 180 to allow the optical signal containing traffic stream 240 to pass to optical transmitter 170. The optical signal containing traffic stream 240 is then added to ring 16 of network 10 using add coupler 112*b*.

Figure 6:
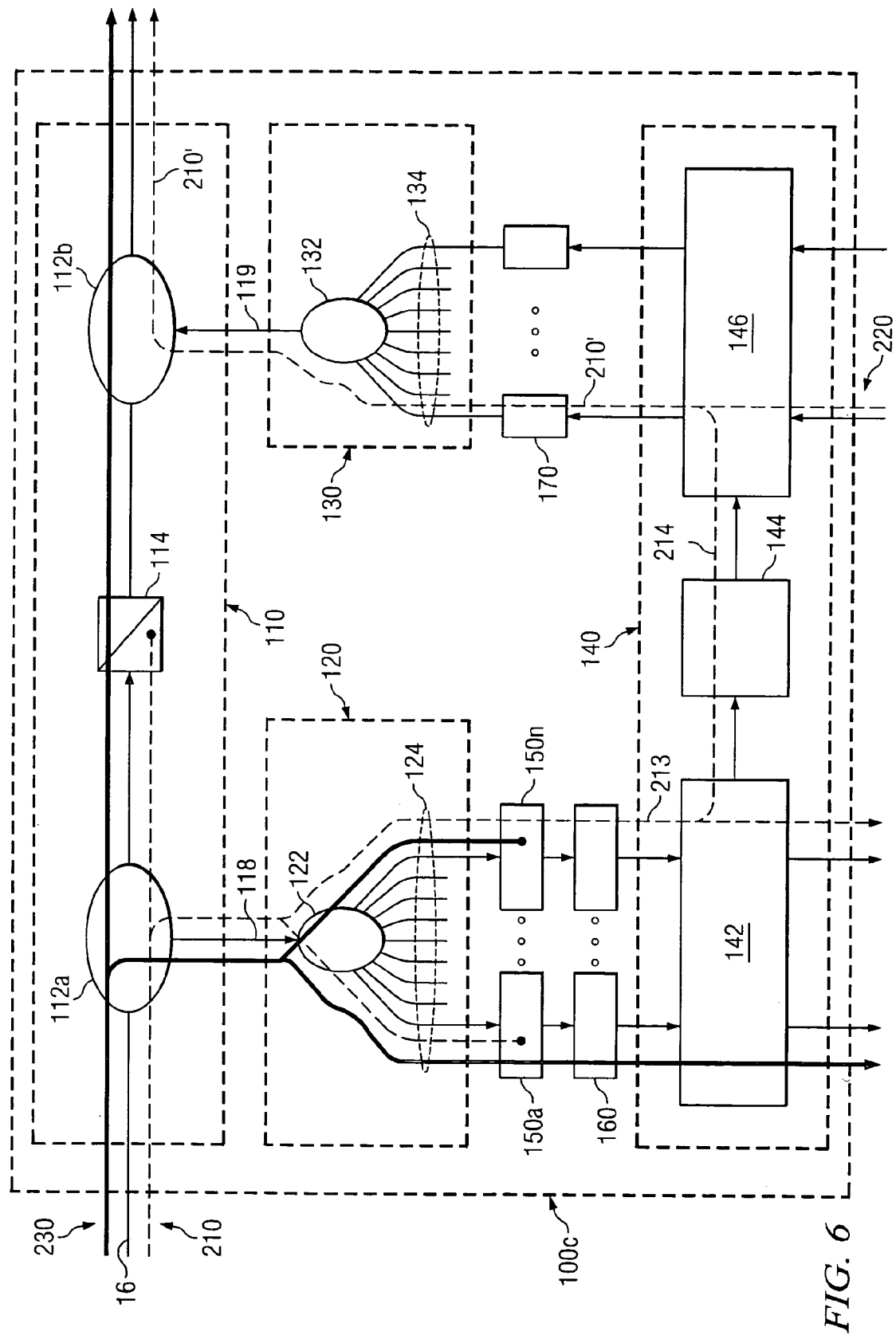
FIG. 6 illustrates another example path of traffic in an exemplary optical channel in an example add/drop node.

FIG. 6 illustrates example paths of optical signals containing optical traffic in exemplary traffic streams 210, 210', and 230 in ADN 100*c*. The optical signal containing traffic streams 210 and 230 enters ADN 100*c* on ring 16. Traffic streams 210 and 230 were added to network 10 at ADN 100*d*. Traffic stream 220 is added to network 10 at ADN 100*c*. Drop coupler 112*a* passively copies the optical signal containing traffic streams 210 and 230 into two generally identical signals. A copy of the optical signal containing traffic streams 210 and 230 is forwarded to rejection filter 114, which is configured by NMS 180, in response to the determined data rate and destination node(s) to block traffic stream 210 from being communicated to other ADNs 100 in network 10, in order to avoid any interference with optical traffic that may be added to the network from subsequent ADNs 100 and passes traffic stream 230 onto subsequent ADNs in network 10. Traffic stream 230 continues on ring 16 through ADN 100*c* because the information it contains is destined for multiple ADNs in network 10. Traffic stream 210 is blocked from further transmission on ring 16 to prevent interference with traffic stream 210'.

The dropped copy of the optical signal containing traffic streams 210 and 230 is forwarded to optical splitter 122 where multiples copies are made. Each copy of the optical signal is then forwarded to tunable filters 150, which are configured by NMS 180 in response to the determined data rate and the destination node(s) to pass only the desired optical channels. In the illustrated example, filter 150*a* is configured to pass the optical channel containing traffic stream 230, while filtering out the optical channel containing traffic stream 210. Similarly, filter 150*n* is configured to pass the optical channel containing traffic stream 210, while filtering out the optical channel containing traffic stream 230. The filtered signals are communicated from filters 150 to optical receivers 160, where the filtered signals are converted from optical signals to electrical signals. Optical receivers 160 then communicate the electrical signals to switch 142, which is configured by NMS 180, in response to the determined data rate and destination node(s), to transmit the signals in a particular manner.

In the present example, switch 142 is configured to pass a portion of the information in traffic stream 210, illustrated by traffic stream 213, and all of the information contained in traffic stream 230 to a local client. Switch 142 is also configured to direct a portion of the traffic in stream 210 to TTL monitor 144, as illustrated by traffic stream 214. TTL monitor 144 examines the TTL code associated with the traffic that it receives. As mentioned above, if the TTL code is "0," the traffic is terminated at the current ADN 100. In the illustrated embodiment, the TTL code of the information contained in traffic stream 214 would be "2" since the traffic is to be removed from network 10 at the second ADN (ADN 100b) downstream of the ADN at which the traffic was added (ADN 100d). TTL monitor decrements the TTL code associated with traffic stream 214 so that the TTL code is "1" as the traffic exits TTL monitor 142. The information in traffic stream 214 is combined at switch 146 with an electrical signal containing information in traffic stream 220, which is added at ADN 100c from a local client, to form traffic stream 210'. In this example, switch 146 is configured by NMS 180 to allow the information contained in traffic stream 210' to pass to optical transmitter 170 where the electrical signals are converted to optical signals. The optical signal containing traffic stream 210' is then added to ring 16 of network 10 using add coupler 112b and is communicated to the next ADN in the network, ADN 100b.

Figure 7:
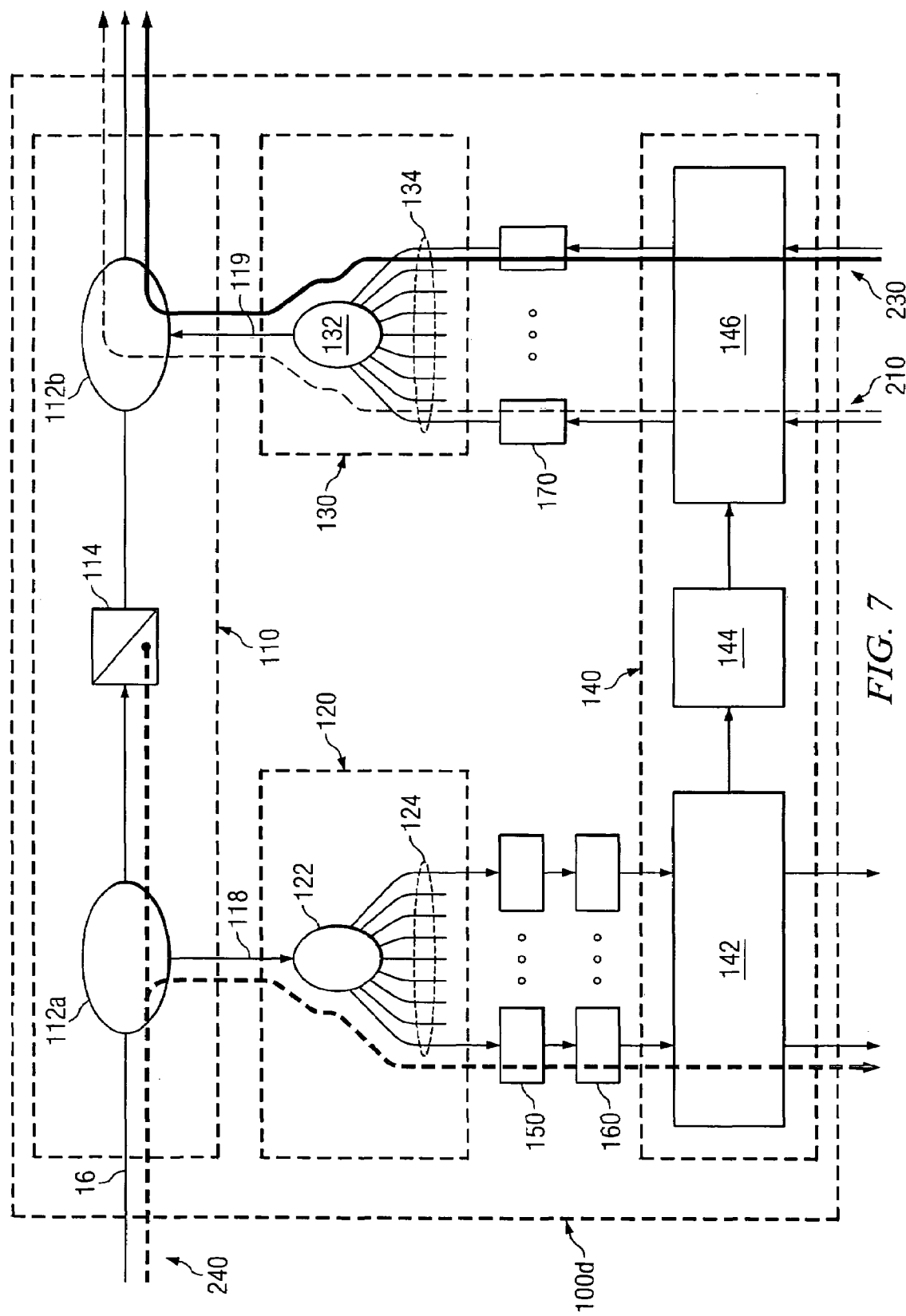
FIG. 7 illustrates another example path of traffic in an exemplary optical channel in an example add/drop node.

FIG. 7 illustrates example paths of optical signals containing optical traffic in exemplary traffic streams 210, 230, and 240 in ADN 100d. The optical signal containing traffic stream 240 was added to network 10 at ADN 100b. Drop coupler 112a passively copies the optical signal containing traffic stream 240 into two generally identical signals. A copy of the optical signal containing traffic stream 240 is forwarded to rejection filter 114, which is configured by NMS 180, in response to the determined data rate and destination node(s) to block the optical signal containing traffic stream 240 from being communicated to other ADNs 100 in network 10, in order to avoid any interference with optical traffic that may be added to the network from subsequent ADNs 100. A copy of the optical signal containing traffic stream 240 is forwarded to optical splitter 122 where multiple copies are made. Each copy of the optical signal is then forwarded to tunable filters 150, which are configured by NMS 180, in response to the determined data rate and the destination node(s) to pass only the desired optical channels.

In the illustrated example, filters 150 are configured to pass the channel containing traffic stream 240. The filtered signals are then communicated from filters 150 to optical receivers 160, where the optical signals are converted to electrical signals. Optical receivers 160 then communicate the filtered electrical signals to switch 142, which is configured by NMS 180, in response to the determined data rate and destination node(s), to pass the electrical signals to a local client without directing any signals back onto ring 16 because the traffic in stream 240 is destined for ADN 100d.

Furthermore, an electrical signal containing traffic streams 210 and 230 is added to network 10 at ADN 100d from a local client. In the illustrated embodiment, switch 146 is configured by NMS 180 to allow the electrical traffic from the local client to pass to optical transmitters 170. Optical transmitters 170 convert the electrical to optical signals. The optical signal containing traffic streams 210 and 230 is then added to ring 16 of network 10 using add coupler 112b.

Figure 8:
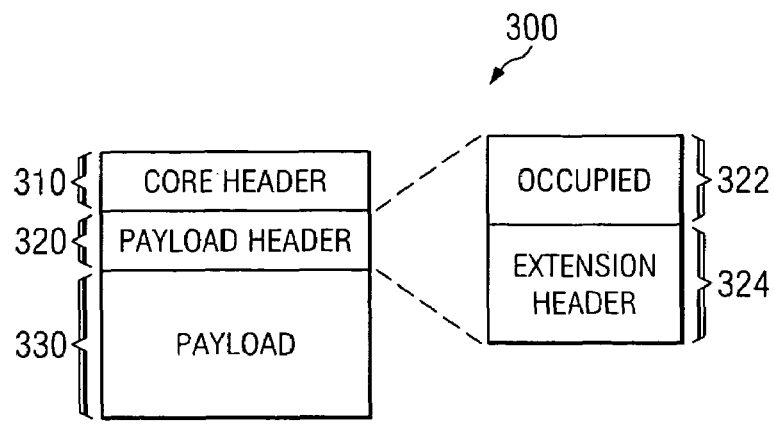
FIG. 8 illustrates an example optical traffic data frame.

FIG. 8 illustrates an example frame 300 for use with optical data communicated using network 10. Frame 300 is a General Framing Procedure (GFP) frame. Frame 300 contains a core header 310, a payload header 320, and payload 330. Core header 310 is a 4-byte field consisting of 2 bytes of payload length indicator (PLI) and a 2 byte core header error control section. Payload header 320 consists of an occupied section 322 and an extension header 324. Occupied section 322 is a 4-byte field consisting of 2 bytes of a payload type header and a 2-byte header error control section. Extension header consists of 0 to 60 bytes of additional header information that may be optionally used for custom applications. Payload 330 consists of one or more 67-byte super blocks and a 4-byte frame check sequence (FCS). Each super block consists of 64 bytes of client data which are divided into eight groups of 8 bytes called "blocks," 1 byte of "Flag" bits with one bit per block, and 2 bytes of error check code.

According to some embodiments of the present invention, extension header 324 may be configured to contain an ingress (source) node address for the optical traffic communicated over network 10, as well as an egress (destination) node address, the TTL code for the optical traffic, a quality of service parameter, and control frame information. Therefore, extension header 324 may be used to designate the ADN 100 to which optical traffic will be communicated, as well as the ADN 100 at which optical traffic is to be dropped to a local client or terminate from the network. Using the GFP frame with an extension header 324 containing ingress and egress node addressing enables a switch module 140 of an ADN 100 receiving the data to determine the destination of the data.

Figure 9:
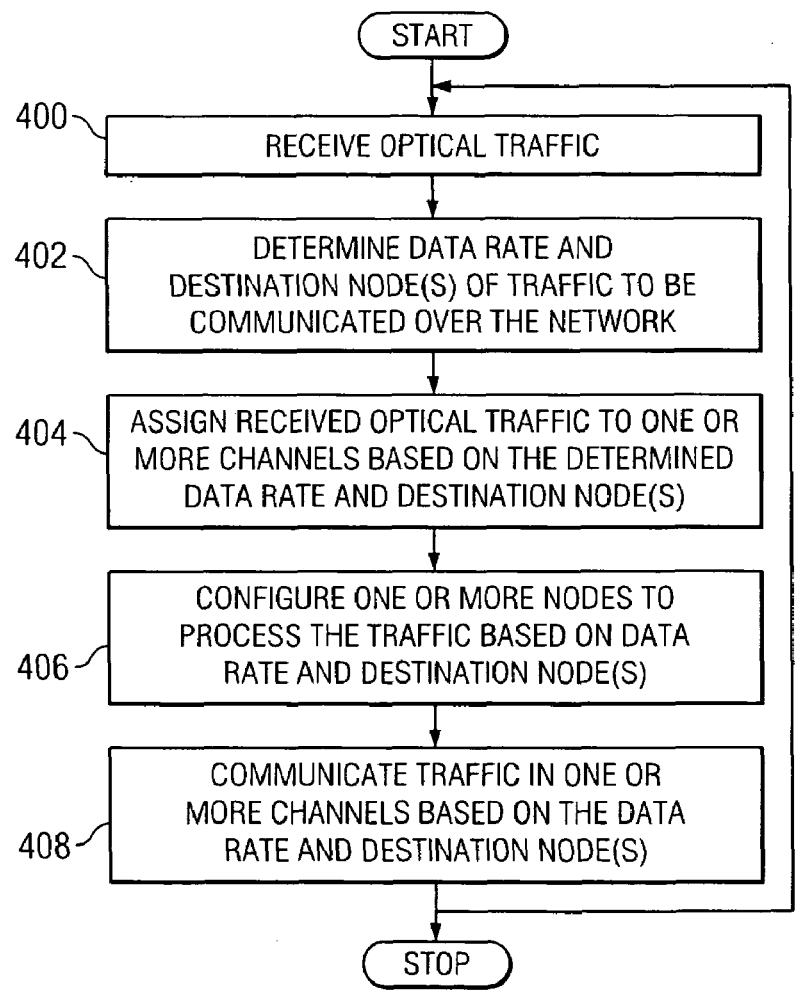
FIG. 9 illustrates an example method for handling optical traffic of varying data rates.

FIG. 9 illustrates an example method for handling optical traffic of varying data rates and destinations in network 10. The method begins at step 400 where optical traffic is received at an ADN 100. At step 402, the data rate and destination node(s) of the received optical traffic is determined. At step 404, the received optical traffic is assigned to one or more channels based on the determined data rate and destination node(s) of the particular traffic stream. For example, as discussed above, the received optical traffic may include OEO traffic, "point-to-multipoint" traffic, or "burst" traffic. In certain embodiments, each type of traffic may be assigned to a different channel. At step 406, each ADN 100 is configured to process the received optical traffic based on the determined data rate and destination node(s) of the traffic. At step 408, the optical traffic is communicated in network 10 in one or more channels based on the determined data rate and destination node(s) of the traffic. The method may return to step 400 to receive additional optical traffic or the method may be terminated, according to the particular circumstances.

Although an example method is illustrated, the present invention contemplates two or more steps taking place substantially simultaneously or in a different order. In addition, the present invention contemplates using methods with additional steps, fewer steps, or different steps, so long as the steps remain appropriate for handling optical traffic of varying data rates at an ADN 100.

Furthermore, although the present invention has been described with several embodiments, a multitude of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method for communicating optical traffic in a network comprising a plurality of network nodes, the method comprising:

receiving traffic to be added to the network at a network node, the network operable to communicate received traffic in an optical signal comprising a plurality of channels;

determining a data rate and one or more destination nodes of the received traffic;

assigning the received traffic to one or more particular channels of the plurality of channels of the optical signal based on the determined data rate and the one or more destination nodes;

configuring one or more of the network nodes to process the traffic contained in the assigned channels based on the data rate and the one or more destination nodes of the optical traffic; and communicating the traffic through network in the assigned channels of the optical signal based on the determined data rate and the one or more destination nodes;

wherein when the data rate is determined to be greater than 5 Gbps and at least a portion of the received traffic is determined to be destined for a single destination node:

assigning the traffic destined for the single destination node to one channel of the optical signal;

configuring the single destination node to pass the traffic in at least one channel of a first copy of the optical signal generated at the destination node through a filter, to terminate the traffic in a second copy of the optical signal generated at the destination node, and to forward the at least one channel of the passed traffic in the first copy generated at the single destination node to one or more local clients associated with the single destination node; and communicating the optical traffic as point-to-point traffic to the single destination node.

2. The method of claim 1, wherein:

determining the data rate comprises determining that the data rate of the traffic comprises from 100 Mbps to 1 Gbps; and communicating the optical traffic comprises communicating the optical traffic as optically-transmitted/electrically-selected/optically-dropped (OEO) traffic.

3. The method of claim 2, wherein:

each node is operable to generate a first copy and a second copy of the optical signal received at the node;

determining the one or more destination nodes comprises determining that a first portion of the received traffic is destined for a first destination node and that a second portion of the received traffic is destined for a second destination node;

assigning the received traffic comprises assigning the first portion of the traffic destined for the first destination node to a first channel of the optical signal and assigning the second portion of the traffic destined for the second destination node to the first channel of the optical signal, and configuring the one or more network nodes comprises configuring the first destination node to:

pass the traffic in at least the first channel of the first copy of the optical signal through a filter;

terminate the traffic in the first channel of the second copy of the optical signal;

forward the first portion of the passed traffic in the first channel of the first copy to one or more local clients associated with the first destination node; and forward the second portion of the passed traffic in the first channel of the first copy to the second destination node.

4. The method of claim 3, further comprising adding, at the first destination node, new traffic from the one or more local clients to the first channel of the first copy generated at the first destination node, the new traffic destined for the second destination node.

5. The method of claim 3, wherein:

the second destination node is operable to generate a first copy and a second copy of the optical signal received at the second destination node;

configuring the one or more network nodes further comprises configuring the second destination node to:

pass the traffic in at least the first channel of a first copy through a filter;

terminate the traffic in the first channel of the second copy of the optical signal; and forward the traffic in the first channel of the first copy to one or more local clients associated with the second destination node.

6. The method of claim 1, wherein:

determining the data rate comprises determining that the data rate of the traffic comprises from 1 Gbps to 5 Gbps; and communicating the optical traffic comprises communicating the optical traffic as point-to-multipoint traffic.

7. The method of claim 6, wherein:

each node is operable to generate a first copy and a second copy of the optical signal received at the first destination node determining the one or more destination nodes comprises determining that at least a portion of the received traffic in the optical signal is destined for a first destination node and a second destination node;

assigning the received traffic comprises assigning the traffic destined for the first and second destination nodes to a first channel of the optical signal; and configuring the one or more network nodes comprises configuring the first destination node to:

pass the traffic in at least the first channel of a first copy of the optical signal through a filter;

forward the second copy of the optical signal; and forward the first channel of the passed traffic in the first copy generated at the first destination node to the one or more local clients associated with the first destination node.

8. The method of claim 7, wherein:

the second destination node is operable to generate a first copy and a second copy of the optical signal received at the second destination node:

configuring the one or more network nodes further comprises configuring the second destination node to:

pass the traffic in at least the first channel of the first copy of the optical signal through a filter;

terminate the traffic in the first channel of the second copy of the of the optical signal; and forward the traffic in the first channel of the first copy to one or more local clients associated with the second destination node.

9. The method of claim 1, wherein the optical traffic is communicated in one or more General Framing Procedure (GFP) frames and the destination of the optical traffic is contained within an extension header of the GFP frame.

10. An optical network operable to communicate traffic in an optical signal in a plurality of channels, the network comprising:

a plurality of network nodes operable to:

receive traffic to be added to the network at the node; and communicate the received traffic through the network in the optical signal based on a data rate of the received traffic and one or more nodes for which the received traffic is destined; and a network management system operable to:
  determine the data rate of the received traffic;
  determine the one or more destination nodes of the received traffic;
  assign the received traffic to one or more particular channels of the plurality of channels of the optical signal based on the determined data rate and the one or more destination nodes of the received traffic; and
  configure one or more of the nodes on the network to process the traffic contained in the assigned channels based on the determined data rate and the one or more destination nodes of the received traffic;
wherein when the network management system determines that the data rate is greater than 5 Gbps and that at least a portion of the received traffic is destined for a single destination node, the network management system is operable to:
  assign the traffic destined for the single destination node to one channel of the optical signal;
  configure the single destination node to pass the traffic in at least one channel of a first copy of the optical signal generated at the destination node through a filter, to terminate the traffic in a second copy of the optical signal generated at the destination node, and to forward the at least one channel of the passed traffic in the first copy generated at the single destination node to one or more local clients associated with the single destination node; and
  communicate the optical traffic as point-to-point traffic to the single destination node.

11. The network of claim 10, wherein:
the network management system is operable to determine that the data rate of the traffic comprises from 100 Mbps to 1 Gbps; and
one or more of the plurality of nodes are operable to communicate the optical traffic as optically-transmitted/electrically-selected/optically-dropped (OEO) traffic.

12. The network of claim 11, wherein:
a first destination node comprises:
  an optical coupler operable to receive the optical signal and generate a first copy and a second copy of the optical signal;
  a rejection filter operable to selectively block or forward one or more channels of the second copy of the optical signal;
  a distributing element operable to receive the first copy from the optical coupler and generate multiple copies of the first copy of the optical signal;
  a plurality of tunable filters each operable to receive one of the multiple copies of the optical signal forwarded from the distributing element and to pass one or more channels of the received copy;
  a plurality of optical receivers each operable to receive the passed channels from an associated tunable filter and convert the optical traffic in the passed channels to an electrical signal; and
  a switch element operable to receive the forwarded electrical signals and selectively forward the electrical signals, or portions thereof, to a local client and/or to another network node, or terminate the electrical signals; and
the network management system is further operable to:
  determine that a first portion of the traffic is destined for the first destination node and that a second portion of the traffic is destined for a second destination node;
  assign the first portion of the traffic destined for the first destination node to a first channel of the optical signal;
  assign the second portion of the traffic destined for the second destination node to the first channel of the optical signal;
  configure a tunable filter of the first destination node to forward the first channel of the first copy of the optical signal to an optical receiver, the optical receiver operable to convert the optical signal to an electrical signal;
  configuring the rejection filter of the first destination node to terminate the traffic in the first channel of the second copy of the optical signal;
  configure the switch element of the first destination node to:
    forward the electrical signals associated with the first portion of the traffic to one or more local clients associated with the first destination node; and
    forward the electrical signals associated with the second portion of the traffic for communication to the second destination node.

13. The network of claim 12, wherein the switch element of the first destination node is further operable to:
receive new traffic from the one or more local clients that is destined for the second destination node; and
add the new traffic to the second portion destined for the second destination node.

14. The network of claim 12, wherein:
the second destination node comprises:
  an optical coupler operable to receive the optical signal and generate a first copy and a second copy of the optical signal;
  a rejection filter operable to selectively block or forward one or more channels of the second copy of the optical signal;
  a distributing element operable to receive the first copy from the optical coupler and generate multiple copies of the first copy of the optical signal;
  a plurality of tunable filters each operable to receive one of the multiple copies copy of the optical signal forwarded from the distributing element and to pass one or more channels of the received copy;
  a plurality of optical receivers each operable to receive the passed channels from an associated tunable filter and convert the optical traffic in the passed channel to an electrical signal;
  a switch element operable to receive the forwarded electrical signals and selectively forward the electrical signals, or portions thereof, to a local client and/or to another network node, or terminate the electrical signals; and
the network management system is further operable to:
  configure the rejection filter of the second destination node to terminate the traffic in the second copy of the optical signal generated by the optical coupler of the second destination node;
  configure a tunable filter of the second destination node to forward the first channel of the first copy of the optical signal generated by the optical coupler of the second destination node to an optical receiver of the second destination node, the optical receiver operable to convert the optical signal to an electrical signal; and
  configure a switch element of the second destination node to forward the electrical signals associated with the traffic in first channel of the first copy to one or more local clients associated with the second destination node.

15. The network of claim 10, wherein:
the network management system is operable to determine that the data rate of the traffic comprises from 1 Gbps to 5 Gbps; and
one or more of the plurality of nodes are operable to communicate the optical traffic as point-to-multipoint traffic.

16. The network of claim 15, wherein:
a first destination node comprises:
an optical coupler operable to receive the optical signal and generate a first copy and a second copy of the optical signal;
a rejection filter operable to selectively block or forward one or more channels of the second copy of the optical signal;
a distributing element operable to receive the first copy from the optical coupler and generate multiple copies of the first copy of the optical signal;
a plurality of tunable filters each operable to receive one of the multiple copies of the optical signal forwarded from the distributing element and to pass one or more channels of the received copy;
a plurality of optical receivers each operable to receive the passed channels from an associated tunable filter and convert the optical traffic in the passed channels to an electrical signal;
a switch element operable to receive the forwarded electrical signals and selectively forward the electrical signals, or portions thereof, to a local client and/or to another network node, or terminate the electrical signals; and
the network management system is further operable to:
determine that at least a portion of the traffic is destined for the first destination node and a second destination node;
assign the at least a portion of the traffic destined for the first and second destination nodes to a first channel of the optical signal;
configure a tunable filter of the first destination node to forward the first channel of the first copy of the optical signal to an optical receiver, the optical receiver operable to convert the optical signal to an electrical signal;
configuring the rejection filter of the first destination node to terminate the traffic in the first channel of the second copy of the optical signal to the second destination node;
configure the switch element of the first destination node to:
forward the electrical signals associated with the traffic to one or more local clients associated with the first destination node; and
forward the electrical signals associated with the traffic for communication to the second destination node.

17. The network of claim 16, wherein:
the second destination node comprises:
an optical coupler operable to receive the optical signal and generate a first copy and a second copy of the optical signal;
a rejection filter operable to selectively block or forward one or more channels of the second copy of the optical signal;
a distributing element operable to receive the first copy from the optical coupler and generate multiple copies of the first copy of the optical signal;
a plurality of tunable filters each operable to receive one of the multiple copies of the optical signal forwarded from the distributing element and to pass one or more channels of the received copy;
a plurality of optical receivers each operable to receive the passed channels from the associated tunable filter and convert the optical traffic in the passed channel to an electrical signal;
a switch element operable to receive the forwarded electrical signals; and selectively forward the electrical signals, or portions thereof, to a local client and/or to another network node, or terminate the electrical signals; and
the network management system is further operable to:
configure the rejection filter of the second destination node to terminate the traffic in the second copy of the optical signal generated by the optical coupler of the second destination node;
configure a tunable filter of the second destination node to forward the first channel of the first copy of the optical signal generated by the optical coupler of the second destination node to the optical receivers of the second destination node, the optical receivers operable to convert the optical signals to an electrical signals; and
configure a switch element of the second destination node to forward the electrical signals associated with the traffic in first channel of the first copy to one or more local clients associated with the second destination node.

18. The network of claim 10, wherein:
the single destination node comprises:
an optical coupler operable to receive the optical signal and generate a first copy and a second copy of the optical signal;
a rejection filter operable to selectively block or forward one or more channels of the second copy of the optical signal;
a distributing element operable to receive the first copy from the optical coupler and generate multiple copies of the first copy of the optical signal;
a plurality of tunable filters each operable to receive one of the multiple copies of the optical signal forwarded from the distributing element and to pass one or more channels of the received copy;
a plurality of optical receivers each operable to receive the passed channels from an associated tunable filter and convert the optical traffic in the passed channels to an electrical signal;
a switch element operable to receive the forwarded electrical signals and selectively forward the electrical signals, or portions thereof, to a local client and/or to another network node, or terminate the electrical signals;
the network management system is further operable to:
determine that at least a portion of the traffic is destined for the single destination node;
assign the at least a portion of the traffic destined for single destination node to a first channel of the optical signal;
configure a tunable filter of the first destination node to forward the first channel of the first copy of the optical signal to an optical receiver, the optical receiver operable to convert the optical signal to an electrical signal;

configuring the rejection filter of the single destination node to terminate the traffic in the first channel of the second copy of the optical signal;

configure the switch element of the single destination node to forward the electrical signals associated with the traffic to one or more local clients associated with the single destination node.

19. The network of claim 10, wherein the optical traffic is communicated in one or more General Framing Procedure (GFP) frames and the destination of the optical traffic is contained within an extension header of the GFP frame.

20. The method of claim 1, wherein communicating the optical traffic comprises communicating the optical traffic as one of optically-transmitted/electrically-selected/optically-dropped (OEO) traffic, point-to-multipoint traffic, or point-to-point traffic depending on the determined data rate.

21. The network of claim 10, wherein one or more of the plurality of nodes are operable to communicate the optical traffic as any of optically-transmitted/electrically-selected/optically-dropped (OEO) traffic, point-to-multipoint traffic, or point-to-point traffic depending on the determined data rate.

* * * * *

UNITED STATES PATENT AND TRADEMARK OFFICE
CERTIFICATE OF CORRECTION

PATENT NO. : 7,369,765 B2 Page 1 of 1
APPLICATION NO. : 10/787496
DATED : May 6, 2008
INVENTOR(S) : Yasuhiko Aoki et al.

It is certified that error appears in the above-identified patent and that said Letters Patent is hereby corrected as shown below:

Column 14:
Line 50, after "copy of the" delete "of the"

Column 16:
Line 41, after "multiple copies" delete "copy."

Signed and Sealed this

Seventh Day of July, 2009

JOHN DOLL
*Acting Director of the United States Patent and Trademark Office*